United States Patent Office 3,635,962
Patented Jan. 18, 1972

3,635,962
CERTAIN 2,4 - BIS-MORPHOLINO- AND 2,4-BIS-THIAMORPHOLINO-PYRIMIDINE - 5 - CARBOXYLIC ACID ESTERS
Edmond G. Wyss, Bern, Switzerland, assignor to Dr. A. Wander S.A., Bern, Switzerland
No Drawing. Filed Nov. 3, 1969, Ser. No. 873,646
Claims priority, application Switzerland, Nov. 8, 1968, 16,679/68; Feb. 28, 1969, 3,039/69; Aug. 5, 1969, 11,857/69
Int. Cl. C07d 99/04, 99/06
U.S. Cl. 260—243 B      46 Claims

ABSTRACT OF THE DISCLOSURE

The invention concerns new pyrimidine derivatives of the Formula I,

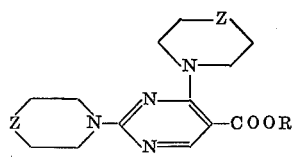

in which:

Z signifies oxygen of sulphur, and
R signifies alkyl, halo-substituted alkyl having up to 4 halo substituents, alkenyl, alkoxyalkyl, cycloalkyl or cycloalkylalkyl, each significance having up to 9 carbon atoms, their acid addition salts and pharmaceutical compositions thereof, as well as to processes for the production of such compounds.

The compounds exhibit narcotic or hypnotic activity.

---

The present invention relates to new pyrimidine derivatives of the Formula I,

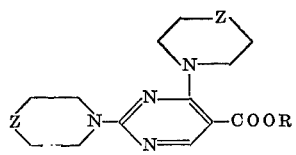

in which:

Z signifies oxygen or sulphur, and
R signifies alkyl, halo-substituted alkyl having up to 4 halo substituents, alkenyl, alkoxyalkyl, cycloalkyl or cycloalkylalkyl, each significance having up to 9 carbon atoms, their acid addition salts and pharmaceutical compositions thereof, as well as to processes for the production of such compounds. The halogen in the above and following halo-substituted alkyl significances is preferably bromine, chlorine or fluorine.

In accordance with the invention:

(a) A compound of the Formula I and an acid addition salt thereof may be produced by:

(1) Reacting a compound of the Formula II,

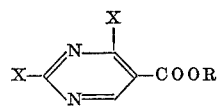

in which:

R has the above significance, and
X signifies a reactive radical capable of being split off together with the hydrogen on the nitrogen atom of morpholine or thiomorpholine, with morpholine or thiomorpholine, or (2) Reacting a compound of the Formula III,

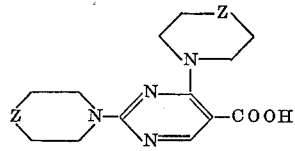

in which Z has the above significance, or a reactive acid derivative or metal salt thereof, with a compound of the Formula VI, $$ROH \quad (VI)$$

in which R has the above significance, or a reactive derivative or alcoholate thereof, or (b) Reacting a halogen or a hydrogen halide with a compound of the Formula Ib,

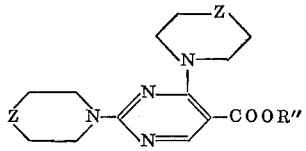

in which:

R″ signifies an alkenyl radical having up to 9 carbon atoms, and
Z has the above significance to obtain a compound of the Formula Ia,

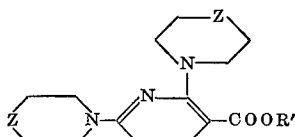

in which:

R′ signifies a halo-substituted alkyl having up to 4 halo substituents and up to 9 carbon atoms, and
Z has the above significance, or (c) Splitting off vicinal halogen atoms, hydrogen halide or water from a compound of the Formula Ic,

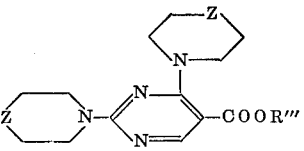

in which:

R‴ signifies an alkyl radical of up to 9 carbon atoms substituted by hydroxy or halogen, and
Z has the above significance, to obtain a compound of the Formula Ib, or (d) Hydrogenating a compound of the Formula Ie,

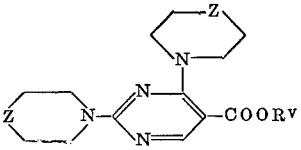

in which:

$R^V$ signifies alkenyl, halo-substituted alkenyl having up to 4 halo substituents, cycloalkenyl or non-aromatic cycloalkylalkyl, each significance having one or more double bonds and having up to 9 carbon atoms, and
Z has the above significance,
to obtain a compound of the formula Id,

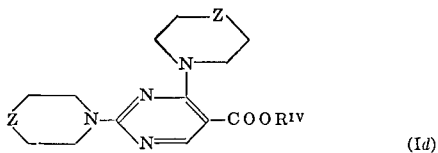

(Id)

in which:

R<sup>IV</sup> signifies an alkyl radical, halo-substituted alkyl having up to 4 halo substituents, cycloalkyl or cycloalkylalkyl, each significance having up to 9 carbon atoms, and Z has the above significance, and where required a resulting acid addition salt is converted into the free base, and a resulting free base is converted into an acid addition salt.

The alkyl or alkenyl radicals indicated as substituents in the above compounds may be straight-chained or branched.

The production of compounds of the Formula I, using processs (a)(1), may be effected as follows:

In the compounds of the Formula II suitable reactive radicals capable of being split off together with the hydrogen on the nitrogen atom of morpholine or thiomorpholine, are especially a halogen atom, preferably a chlorine atom, the sulfhydryl radical, a lower alkylthio radical, for example the methylthio radical, or an aralkylthio radical which may optionally be activated by substituents, e.g. the p-nitrobenzylthio radical. The compounds are reacted with morpholine or thiomorpholine, conveniently in an organic solvent which is inert under the reaction conditions, for example benzene, toluene or preferably a lower aliphatic alcohol, for 3 to 15 hours at a temperature between room temperature (20° C.) and the boiling temperature of the reaction mixture. It has been found to be especially advantageous to effect the reaction for about 8 hours at the boiling temperature of the reaction mixture. The reaction may likewise be effected without solvent under the same temperature and time conditions, but in this case it is advantageous to use an excess of morpholine or thiomorpholine.

When compounds of general Formula II, in which X signifies halogen, are used as starting materials, and it is desired to obtain the free bases of general Formula I, then the reaction may be effected in the presence of an acid-binding agent, e.g. triethyl amine, or using at least a 100% excess of morpholine or thiomorpholine.

When compounds of general Formula II, in which X signifies halogen, are used as starting materials, and no acid-binding agent or no excess of morpholine or thiomorpholine is used, then acid addition salts of compounds of general Formula I are obtained, from which the bases may be liberated in manner known per se.

The production of compounds of the Formula I, using the process (a)(2), may be effected as follows:

The compounds of general Formula III are advantageously reacted in the form of reactive acid derivatives, e.g. halides, especially chlorides, with compounds of general Formula VI, preferably in an organic solvent which is inert under the reaction conditions, e.g. benzene, chloroform or toluene, by heating to the boiling temperature of the reaction mixture for 1 to 10 hours. The reaction is preferably effected at the boil for 3 hours. The reaction may likewise be effected without solvent under the temperature and time conditions indicated above, but in this case it is advantageous to use an excess of the alcohol.

A further embodiment of the process (a)(2) consists in reacting an acid halide, especially an acid chloride, of a compound of general Formula III, with a metal alcoholate, especially an alkali metal alcoholate, e.g. a sodium alcoholate of an alcohol of general Formula VI. In this case reaction is likewise effected advantageously in one of the above-mentioned organic solvents which is inert under the reaction conditions, under the time and temperature conditions indicated above.

In accordance with a third embodiment of the process for the production of compounds of the Formula I a metal salt, especially a silver salt, of a compound of general Formula III is reacted with a reactive derivative of a compound of general Formula VI, e.g. with the corresponding halide, especially chloride, or tosylate. In this case the reaction is likewise effected advantageously in one of the above-mentioned organic solvents which is inert under the reaction conditions, under the time and temperature conditions indicated above.

The production of compounds of the Formula Ia, using the process (b), may be effected as follows:

A compound of general Formula Ib is dissolved in the corresponding hydrohalic acid and the reaction mixture is heated to a temperature between room temperature and 120° C., preferably between 60° and 70° C., for 15 minutes to 3 hours. It is also possible to dissolve the compounds of general Formula Ib in an organic solvent which is inert under the reaction conditions, e.g. chloroform, methylene chloride or benzene, and add halogen to the reaction mixture.

The production of compounds of the Formula Ib, using the process (c), may be effected as follows:

A compound of general Formula Ic, containing an alkyl radical which is substituted by hydroxyl radicals, is treated with a dehydration agent, e.g. acetic anhydride of a hydrohalic acid, especially hydrochloric acid, or toluenesulphonic acid, at a temperature from 50° C. to the boiling temperature of the mixture for one-half hour to 5 hours. The removal of water is preferably effected at the boiling temperature of the reaction mixture.

Compounds of general Formula Ic, containing an alkyl radical which is substituted by vicinal halogen radicals, are conveniently treated with bivalent metals, especially zinc, in an organic solvent which is inert under the reaction conditions, especially a lower alcohol, at a temperature from 50° C. to the boiling temperature of the reaction mixture. The splitting off of halogen is preferably effected at the boiling temperature of the reaction mixture.

Compounds of general Formula Ic, containing alkyl radicals which are substituted by halogen radicals, are treated with basic reagents, e.g. an alcoholic potash lye, or with sodium amide, in an organic solvent which is inert under the reaction conditions, e.g. xylene, toluene or benzene, at a temperature from 50° C. to the boiling temperature of the reaction mixture. The splitting off of the hydrogen halide is preferably effected at the boiling temperature of the reaction mixture.

The production of compounds of the Formula Id, using the process (d), may be effected as follows:

A compound of general Formula Ie is dissolved in an organic solvent which is inert under the reaction conditions, e.g. ethyl acetate, and hydrogenation is subsequently effected in the presence of a catalyst, e.g. a noble metal catalyst, especially palladium charcoal or platinum oxide, until the taking up of hydrogen is completed. Hydrogenation is conveniently effected at atmospheric pressure or at a slight excess pressure up to 1.5 atmospheres, at room temperature.

However, compounds of general Formula Id may likewise be obtained by dissolving a compound of general Formula Ie in a cyclic or straight-chained ether, e.g. tetrahydrofuran or dimethyl ether, and subsequently treating with a complex hydride, e.g. lithium aluminium hydride, at a temperature from room temperature to the boiling temperature of the reaction mixture.

The compounds of general Formula I obtained in accordance with the invention may be isolated from the corresponding reaction mixtures in manner known per se, e.g. by extraction, evaporation of the solution or salt formation, and may be purified in manner known per se, e.g. by recrystallization, or, if possible, distillation. The compounds of general Formula I may be liberated from resulting salts in manner known per se, e.g. by treating with aqueous alkali metal hydroxide solutions. The compounds of general Formula I obtained in accordance with the invention may be converted into their acid addition salts by treating with suitable organic or inorganic acids.

The production of the compounds of general Formula II, in which X signifies a halogen atom, used as starting materials in process (a)(1), may be effected as follows:

A compound of general Formula IV,

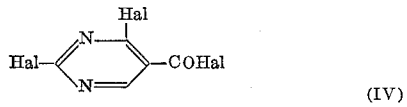

(IV)

in which Hal signifies halogen, is reacted with a compound of general Formula VI. The reaction is conveniently effected by allowing the compound of general Formula IV to react with the compound of general Formula VI in an organic solvent which is inert under the reaction conditions, e.g. toluene, in the presence of an acid-binding agent, e.g. triethyl amine, at a temperature from $-5°$ to $+10°$ C., and subsequently heating the reaction mixture to the boil for about 2 hours.

Reaction of compounds of general Formula IV with compounds of general Formula VI in an organic solvent which is inert under the reaction conditions, e.g. toluene, and in the presence of an acid-binding agent, e.g. triethyl amine, at the boiling temperature of the reaction mixture, yields compounds of general Formula V,

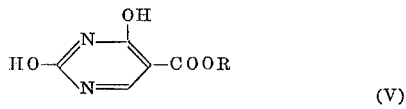

(V)

in which R has the above significance, which may subsequently be converted into compounds of general Formula II, in which X is halogen, by reaction with a halogenating agent, e.g. thionyl chloride.

The compounds of general Formula V may likewise be obtained by allowing uracil-5-carboxylic acid with thionyl chloride in the presence of a catalytic amount of dimethyl formamide to stand for 60 hours, subsequently heating for a short time to the boiling point of the reaction mixture and then reacting the reaction product with compounds of general Formula VI.

The compounds of general Formulae IV and VI, used as starting materials for the above processes, are known or may be produced in manner known per se.

The starting materials of general Formula II, in which X signifies the sulfhydryl radical, may, for example, be obtained by reacting uracil-5-carboxylic acid with phosphorus pentasulphide and esterifying the reaction product or its reactive acid derivative, especially the halide, with a compound of general Formula VI. Alkylation or aralkylation of these compounds yields the compounds of general Formula II, in which X signifies an alkylthio radical or an optionally activated aralkylthio radical.

Those starting materials of general Formula II, in which the radical X signifies other than a halogen atom, the sulfhydryl radical, an alkylthio radical or an optionally activated aralkylthio radical, may be produced in analogous manner.

The compounds of general Formula III used as starting materials in process (a)(2), may, for example, be obtained by reacting 2,4-dichloro-5-carboxy pyrimidine with morpholine or thiomorpholine. 2,4-dichloro-5-carboxy pyrimidine may be obtained by treating 2,4-dichlorouracil-5-carboxylic acid chloride with wet ether.

The compounds of general Formula Ib used as starting materials, as well as some of the compounds of general Formula Ic, having alkyl ester radicals which are substituted by halogen, are included in the compounds of general Formula I and may therefore be produced in a manner analogous to the compounds of general Formula I, using the process indicated in section (a). The remaining compounds of general Formula Ic, having alkyl ester radicals which are substituted by halogen, as well as compounds of general Formula Ie, having alkenyl ester radicals substituted by halogen, as well as those compounds of general Formula Ie having cycloalkenyl or unsaturated cycloalkylalkyl radicals, may be produced in a manner analogous to the compounds of general Formula I from the known starting materials described above.

Compounds of the Formula Ic, having alkyl ester radicals substituted by hydroxyl radicals, are included in the compounds of the Formula VII,

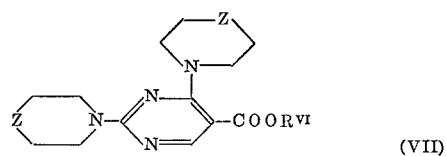

(VII)

in which:

Z has the above significance, and $R^{VI}$ signifies an alkyl radical having up to 9 carbon atoms and having one or more hydroxy substituents.

The compounds of general Formula VII are new and together with the processes for their production described below also form part of the present invention.

Compounds of the Formula VII may be obtained:

(e) By reacting a compound of the Formula VIII,

(VIII)

in which:

X signifies a reactive radical capable of being split off together with the hydrogen on the nitrogen atom of morpholine or thiomorpholine, and $R^{VI}$ has the above significance, with morpholine or thiomorpholine, or (f) By reacting a compound of the Formula III, in which Z has the above significance, or a reactive acid derivative or a metal salt thereof, with an alcohol of the Formula IX,

 $R^{VI}OH$ (IX)

in which $R^{VI}$ has the above significance, or a reactive derivative or alcoholate thereof.

Compounds of general Formula VII may also be obtained in the form of acid addition salts in a manner analogous to the compounds of general Formula I. Suitable acids for salt formation of the compounds of general Formula VII are the same acids which may be used for salt formation of the compounds of general Formula I.

Processes (e) and (f) may be effected in manner analogous to process (a)(1) and (a)(2) respectively.

The production of the compounds of general Formula VIII, used as starting materials in process (e), may be effected in a manner analogous to that described for the production of compounds of general Formula II. However, attention should be paid that the reaction of the corresponding starting materials (e.g. the compounds of general Formula IV) with the hydroxy-containing alkyl group, should be effected under suitable reaction conditions, e.g. in an inert organic solvent, e.g. toluene, in the presence of an acid-binding agent, e.g. triethyl amine, at a temperature from about $-5°$ to about $+10°$ C., and subsequent heating to the boil of the reaction mixture for 2 hours, so that a later treatment with a halogenation agent, which is detrimental to the hydroxyl radicals of the alkyl ester radical, is avoided.

The compounds of the Formula I obtained in accordance with the invention are basic compounds. They may be converted into acid addition salts, for example by reaction with methanesulphonic acid or picric acid, or hydrohalic acids, nitric acid or phosphoric acid.

The compounds I are useful because they possess pharmaco-dynamic properties in animals. More particularly, the compounds are useful narcotics or hypnotics as indicated from tests with animals, e.g. mice, rats and dogs. Illustrative of the narcotic properties of the compounds I are the results shown in the following table which gives a comparison of the effects of compounds of the invention with sodium pentobarbital, known as the most effective narcotic. The hypnotic or narcotic effect is measured by the i.v. dose ($ED_{50}$) at which 50% of the test mice fall into a side position. The table furthermore indicates the intravenous toxicity in mice as an $LD_{50}$.

TABLE

| Compound | Side position $ED_{50}$ mg./kg. i.v. (mouse) | Toxicity $LD_{50}$ mg./kg. i.v. (mouse) |
|---|---|---|
| 2,4-bis-morpholino-5-carbomethoxy pyrimidine | 22 | >100 |
| 2,4-bis-morpholino-5-carbethoxy pyrimidine | 17.5 | 155 |
| 2,4-bis-morpholino-5-carbisopropoxy pyrimidine | 10 | 59 |
| 2,4-bis-morpholino-5-carbobutoxy pyrimidine | 8 | 76 |
| 2,4-bis-morpholino-5-carbo-sec-butoxy pyrimidine | 9.6 | 35 |
| 2,4-bis-morpholino-5-carbisobutoxy pyrimidine | 4 | 59 |
| 2,4-bis-morpholino-5-carbisopentoxy pyrimidine | 5.1 | 59 |
| 2,4-bis-morpholino-5-carbo-tert. pentoxy pyrimidine | 7.6 | 50 |
| 2,4-bis-morpholino-5-carbopentoxy pyrimidine | 8.3 | 43 |
| 2,4-bis-morpholino-5-carbo-(pentyl(3)oxy) pyrimidine | 10 | >50 |
| 2,4-bis-morpholino-5-carbo-(2-ethyl-butoxy) pyrimidine | ~8 | >50 |
| 2,4-bis-morpholino-5-carbo-(2-methyl-butoxy) pyrimidine | ~9 | >50 |
| 2,4-bis-morpholino-5-carballyloxy pyrimidine | 10 | 109 |
| 2,4-bis-morpholino-5-carbisobutylenoxy pyrimidine | ~9 | >50 |
| 2,4-bis-morpholino-5-carbo-(2,3-dibromo-2-methyl-propoxy) pyrimidine | 10 | >50 |
| 2,4-bis-morpholino-5-carbo-(2-ethoxy) pyrimidine | 18 | 220 |
| 2,4-bis-morpholino-5-carbo-(2n-butoxy-ethoxy) pyrimidine | 11 | >50 |
| 2,4-bis-morpholino-5-carbo-cyclohexoxy pyrimidine | 9 | 87 |
| 2,4-bis-morpholino-5-carbo-cyclopentoxy pyrimidine | 13 | >50 |
| 2,4-bis-morpholino-5-carbo-cycloheptoxy pyrimidine | 8 | >50 |
| 2,4-bis-morpholino-5-cyclohexyl-methylenoxy-carbonyl pyrimidine | 8 | >50 |
| Sodium pentobarbital | 33 | 80 |

The table shows that the compounds of the invention are effective at considerably lower doses than sodium pentobarbital and that they furthermore have a greater therapeutic breadth (quotient between $LD_{50}$ and $ED_{50}$).

For the abovementioned use, the dosage administered will, of course, vary depending upon the compound employed, mode of administration and treatment desired. However, in general, satisfactory results are obtained when administered at a daily dosage of from about 1 milligram to about 30 milligrams per kilogram of animal body weight, preferably given in divided doses 2 to 4 times a day or in sustained release form. For the larger mammals, the total daily dosage is in the range of from about 125 milligrams to about 1500 milligrams, preferably 125 milligrams to 500 milligrams, and convenient dosage forms for oral administration comprise from about 30 milligrams to about 250 milligrams of the compound admixed with a solid or liquid pharmaceutical carrier or diluent.

The compounds of Formula I and their acid addition salts may be used in the form of pharmaceutical preparations, which aside from the active agent may contain organic or inorganic, solid or liquid carrier materials, for enteral or parenteral administration. Examples of such pharmaceutical preparations are tablets, dragées and injectable solutions.

In the following non-limitative examples all temperatures are indicated in degrees centigrade and are corrected.

EXAMPLE 1

2,4-bis-morpholino-5-carbisobutoxy pyrimidine 11.7 g. of 2,4-dichloro-5-carbisobutoxy pyrimidine are dissolved in 100 cc. of isobutanol, and 11 g. of triethyl amine and 8.8 g. of morpholine are added. The mixture is heated to the boil under reflux for 8 hours and is subsequently evaporated to dryness. The residue is dissolved in chloroform and washed with water with the addition of ice, is dried with sodium sulphate and evaporated to dryness. The residue is dissolved in hexane and filtered through aluminium oxide. After evaporating the solvent 2,4-bis-morpholino-5-carbisobutoxy pyrimidine is obtained in the form of an oil, which after standing for an extended period yields crystals having an M.P. of 64–68°. The methanesulphonate of this base has an M.P. of 165–167°.

The 2,4-dichloro-5-carbisobutoxy pyrimidine, used as starting material, may be produced as follows:

A solution of 10 g. of 2,4-dichloro-uracil-5-carboxylic acid chloride in 100 cc. of absolute toluene is added dropwise while stirring and cooling with ice to a mixture of 3.7 g. of isobutanol, 8 g. of triethyl amine and 120 cc. of absolute toluene, whereupon the mixture is heated under reflux for 2 hours. The reaction mixture is subsequently washed with water and a 2 N aqueous potassium carbonate solution, dried with sodium sulphate and concentrated by evaporation in a vacuum. 2,4-dichloro-5-carbisobutoxy pyrimidine is obtained in the form of a reddish coloured liquid having a B.P. of 140–150°/0.4 mm. of Hg.

EXAMPLE 2

2,4-bis-morpholino-5-carbisobutoxy pyrimidine 13.8 g. of 2,4-dichloro-5-carbisobutoxy pyrimidine are dissolved in 80 cc. of ethanol, 20 g. of morpholine are added and the mixture is heated to 100° for 6½ hours. The reaction mixture is subsequently evaporated to dryness and the residue dissolved in chloroform. The chloroform solution is washed with water, dried with sodium sulphate and concentrated by evaporation. 2,5 - bis-morpholino-5-carbisobutoxy pyrimidine, having an M.P. of 70–73°, is obtained and is identical with the product obtained in accordance with Example 1.

The 2,4-dichloro-5-carbisobutoxy pyrimidine, used as starting material in this example, may be produced as follows:

10 g. of 2,4-dichloro-uracil-5-carboxylic acid chloride are heated under reflux for 3 hours with 50 cc. of isobutanol. The reaction mixture is subsequently cooled well and the precipitated product is filtered off and washed with ether. The resulting 2,4-dihydroxy-5-carbisobutoxy pyrimidine is heated under reflux for 16 hours with 100 cc. of thionyl chloride. The thionyl chloride is distilled off, the residue is poured on ice and extracted with ether. The ether phase is washed with water until neutral, is dried with sodium sulphate and concentrated by evaporation in a vacuum. 2,4-dichloro-5-carbisobutoxy pyrimidine is obtained in the form of a liquid having a B.P. of 140–150°/0.4 mm. of Hg.

EXAMPLE 3

2,4-bis-morpholino-5-carbisobutoxy pyrimidine 10 g. of 2,4-bis-morpholino-5-carboxy pyrimidine hydrochloride are boiled for 2½ hours with 80 cc. of thionyl chloride. After distilling off the thionyl chloride, 40 cc. amounts of dried benzene are added twice and the mixture is every time evaporated to dryness. The residue is taken up in a mixture of 20 cc. of isobutanol and 50 cc. of absolute chloroform and is heated under reflux for three hours. The residue obtained after evaporating the solvent is dissolved in a small amount of water, is made neutral with a 5 N caustic soda solution while cooling and is exhaustively extracted with chloroform. The chloroform phase is dried with sodium sulphate and concentrated by evaporation in a vacuum. The residue is crystallized from petroleum ether, whereby 2,4-bis-morpholino-5-carbisobutoxy pyrimidine, having an M.P. of 64–68°, is obtained, this product being identical with the products obtained in accordance with Examples 1 and 2.

The 2,4-bis-morpholino-5-carboxy pyrimidine hydrochloride, used as starting material in this example, may be produced as follows:

20 g. of 2,4-dichloro-uracil-5-carboxylic acid chloride are dissolved in 120 cc. of diethyl ether and 20 cc. of water are added. The reaction mixture is stirred at 30–35° for 1 hour, whereupon the ether phase is separated, dried with sodium sulphate, filtered and concentrated by evaporation in a vacuum at 40°. The resulting oily residue becomes crystalline upon cooling and has an M.P. of 97–101°. 17.3 g. of the 2,4-dichloro-5-carboxy pyrimidine hydrochloride obtained above are suspended in a mixture of 100 cc. of benzene and 20 cc. of diethyl ether, and a mixture of 18.2 g. of morpholine and 18.8 g. of triethyl amine is added dropwise while stirring and cooling with ice. The reaction mixture is allowed to stand at room temperature for 15 hours, is heated to 80° for 1 hour and is filtered whilst hot. The solid residue is extracted by boiling with 70 cc. of butanol for a short time. The combined filtrates are concentrated by evaporation in a vacuum at 50°. The oily residue is dissolved in 30 cc. of methanol and ethereal hydrochloric acid is added while cooling with ice. The 2,4-bis-morpholino-4-carboxy pyrimidine hydrochloride which crystallizes upon cooling is filtered off and crystallized from a mixture of methanol and a small amount of ether. The resulting product has a double melting point of 165–170°/225–232°.

EXAMPLE 4

2,4-bis-morpholino-5-carbo-(2-bromo-2-methyl-propoxy)-pyrimidine 6 g. of 2,4-bis-morpholino-5-carbisobutylenoxy pyrimidine are dissolved in 50 cc. of 66% aqueous hydrobromic acid and heated on a water bath for 15 minutes. After allowing the reaction mixture to stand for 17 hours, it is poured on a mixture of ice and aqueous sodium hydroxide solution and is exhaustively extracted with methylene chloride. The organic phase is washed with water until neutral, is dried with sodium sulphate and concentrated by evaporation in a vacuum. The resulting oil is dissolved in ether and ethereal picric acid is added. The resulting picrate is filtered with chloroform and methylene chloride through aluminium oxide. The filtrate is concentrated by evaporation, whereby 2,4-bis-morpholino-5-carbo-(2-bromo-2-methyl-propoxy) pyrimidine is obtained in the form of an oil, which after standing yields crystals having an M.P. of 86–94°.

EXAMPLE 5

2,4-bis-morpholino-5-carbo-(2,3-dibromo-2-methyl-propoxy)-pyrimidine 6 g. of 2,4-bis-morpholino-5-carbisobutenyloxy pyrimidine are dissolved in 70 cc. of chloroform and bromine is added to the resulting solution while stirring. The reaction mixture is subsequently heated on a steam bath for 30 minutes, is allowed to stand for 30 minutes and is then concentrated by evaporation in a vacuum. The resulting oil is dissolved in ether and ethereal picric acid is added. The resulting picrate is filtered with chloroform through aluminium oxide. The filtrate is concentrated by evaporation, whereby 2,4-bis-morpholino-5-carbo-(2,3-dibromo-2-methyl-propoxy) pyrimidine is obtained in the form of an oil, which after standing yields crystals having an M.P. of 102–110°.

EXAMPLE 6

2,4-bis-morpholino-5-carbisobutylenoxy pyrimidine

A solution of 5.3 g. of 2,4-bis-morpholino-5-carboxylic acid (2-hydroxy-2,2-dimethylethyl ester) pyrimidine in 8 cc. of acetic anhydride is heated to the boil in a reflux condenser for 3 hours. The residue obtained after concentrating the reaction mixture by evaporation is dissolved in chloroform, and the chloroform solution is washed with a 2 N aqueous potassium bicarbonate solution, is dried with sodium sulphate and concentrated by evaporation in a vacuum. 2,4-bis-morpholino-5-carbisobutylenoxy primidine is obtained as residue in the form of crystals having an M.P. of 69–70°.

The production of 2,4-bis-morpholino-5-carboxylic acid (2-hydroxy-2,2-dimethylethyl ester) pyrimidine, used as starting material, may be effected as follows:

10 g. of 2,4-bis-morpholino-5-carboxy pyrimidine hydrochloride are heated to the boil for 2½ hours with 80 cc. of thionyl chloride. After distilling off the thionyl chloride 40 cc. amounts of dry benzene are added twice and the mixture is every time evaporated to dryness. The residue is taken up in a mixture of 24.5 cc. of 2,2-dimethyl-ethylene glycol and 50 cc. of absolute chloroform and is subsequently heated to the boil under reflux for 3 hours. The residue obtained after evaporating the solvent is dissolved in a small amount of water, is made neutral with a 5 N caustic soda solution while cooling and is exhaustively extracted with chloroform. The chloroform phase is dried with sodium sulphate and concentrated by evaporation in a vacuum. The residue is crystallized from petroleum ether, whereby 2,4-bis-morpholino-5-carboxylic acid (2-hydroxy-2,2-dimethylethyl ester) pyrimidine is obtained.

EXAMPLE 7

2,4-bis-morpholino-5-carbisobutoxy pyrimidine 5.2 g. of 2,4-bis-morpholino-5-carbisobutylenoxy pyrimidine are dissolved in 20 cc. of ethyl acetate and 0.5 g. of 5% palladium charcoal are added. The mixture is hydrogenated at room temperature and 1.3 atmospheres of pressure while stirring until the taking up of hydrogen is completed. After separating the catalyst the reaction mixture is evaporated to dryness. The residue is dissolved in hexane and filtered through aluminium oxide. After concentrating the filtrate by evaporation 2,4-bis-morpholino-5-carbisobutoxy pyrimidine is obtained in the form of an oil, which after standing for an extended period yields crystals having an M.P. of 64–68°. This product is identical with the product obtained in Example 1.

EXAMPLE 8

2,4-bis-morpohlino-5-carbisopropoxy pyrimidine 2,4 - bis - morpholino - 5 - carbisopropoxy pyrimidine is obtained in the form of an oil in a manner analogous to that described in Example 1, except that 2,4-dichloro-5-carbisopropoxy pyrimidine is used as starting material.

Picrate.—The resulting oil is dissolved in ether and ethereal picric acid is added. The residue obtained after concentrating the reaction mixture by evaporation is crystallized from methanol/water. 2,4-bis-morpholino-5-carbisopropoxy pyrimidine picrate, having an M.P. of 170–172°, is obtained.

EXAMPLE 9

2,4-bis-morpholino-5-carbobutoxy pyrimidine

Proceeding in a manner analogous to that described in Example 8, but using 2,4-dichloro-5-carbobutoxy pyrimidine as starting material, 2,4-bis-morpholino-5-carbobutoxy pyrimidine is obtained and after reacting this with picric acid 2,4-bis-morpholino-5-carbobutoxy pyrimidine picrate, having an M.P. of 163–166°, is obtained.

EXAMPLE 10

2,4-bis-morpholino-5-carbo-sec.butoxy pyrimidine

Proceeding in a manner analogous to that described in Example 8, but using 2,4-dichloro-5-carbo-sec.butoxy pyrimindine as starting material, 2,4-bis-morpholino-5-carbo - sec.butoxy pyrimidine is obtained, and after reacting this with picric acid 2,4 - bis - morpholino-5- carbo-sec.butoxy pyrimidine picrate, having an M.P. of 158–160° is obtained.

EXAMPLE 11

2,4-bis-morpholino-5-carbo-tert.pentoxy pyrimidine

Proceeding in a manner analogous to that described in Example 8, but using 2,4-dichloro-5-carbo-tert.pentoxy pyrimidine as starting material, 2,4-bis-morpholino-5-carbo-tert.pentoxy pyrimidine is obtained, and after reacting this with picric acid 2,4-bis-morpholino-5-carbo-tert.pentoxy pyrimidine picrate, having an M.P. of 163–166°, is obtained.

EXAMPLE 12

2,4-bis-morpholino-5-carbohexoxy pyrimidine

Proceeding in a manner analogous to that described in Example 8, but using 2,4-dichloro-5-carbohexoxy pyrimidine as starting material, 2,4-bis-morpholino-5-carbohexoxy pyrimidine is obtained, and after reacting this with picric acid 2,4-bis-morpholino-5-carbohexoxy pyrimidine picrate, having an M.P. of 121–125°, is obtained.

EXAMPLE 13

2,4-bis-morpholino-5-carbisopentoxy pyrimidine

Proceeding in a manner analogous to that described in Example 8, but using 2,4-dichloro-5-carbisopentoxy pyrimidine as starting material, 2,4-bis-morpholino-5-carbisopentoxy pyrimidine is obtained, and after reacting this with picric acid, 2,4-bis-morpholino-5-carbisopentoxy pyrimidine picrate, having an M.P. of 160–164°, is obtained.

EXAMPLE 14

2,4-bis-morpholino-5-carbethoxy pyrimidine

Proceeding in an manner analogous to that described in Example 1, but using 2,4-dichloro-5-carbethoxy pyrimidine as starting material, 2,4-bis-morpholino-5-carbethoxy pyrimidine, having an M.P. of 92–94°, is obtained.

EXAMPLE 15

2,4-bis-morpholino-5-carbomethoxy pyrimidine

Proceeding in a manner analogous to that described in Example 1, but using 2,4-dichloro-5-carbomethoxy pyrimidine as starting material, 2,4-bis-morpholino-5-carbomethoxy pyrimidine having an M.P. of 117–120°, is obtained.

EXAMPLE 16

2,4-bis-morpholino-5-carbopropoxy pyrimidine

Proceeding in a manner analogous to that described in Example 1, but using 2,4-dichloro-5-carbopropoxy pyrimidine as starting material, 2,4 - bis-morpholino-5-carbopropoxy pyrimidine, having an M.P. of 68–75°, is obtained.

EXAMPLE 17

2,4-bis-morpholino-5-carbopentoxy pyrimidine

Proceeding in a manner analogous to that described in Example 8, but using 2,4-dichloro-5-carbopentoxy pyrimidine as starting material, 2,4-bis-morpholino-5-carbopentoxy pyrimidine is obtained, and after reacting this with picric acid, 2,4-bis-morpholino-5-carbopentoxy pyrimidine picrate, having an M.P. of 156–159°, is obtained.

EXAMPLE 18

2,4-bis-morpholino-5-carbo-tert.butoxy pyrimidine

Proceeding in a manner analogous to that described in Example 8, but using 2,4-dichloro-5-carbo-tert.butoxy pyrimidine as starting material, 2,4-bis-morpholino-5-carbo-tert.butoxy pyrimidine is obtained, and after reacting this with picric acid, 2,4-bis-morpholino-5-carbo-tert.butoxy pyrimidine picrate, having an M.P. of 188–191°, is obtained.

EXAMPLE 19

2,4-bis-morpholino-5-carbononoxy pyrimidine

Proceeding in a manner analogous to that described in Example 1, but using 2,4-dichloro-5-carbononoxy pyrimidine as starting material, 2,4-bis-morpholino-5-carbononoxy pyrimidine is obtained in the form of an oil which cannot be distilled.

EXAMPLE 20

2,4-bis-morpholino-5-carboheptoxy pyrimidine

Proceeding in a manner analogous to that described in Example 1, but using 2,4-dichloro-5-carboheptoxy pyrimidine as starting material, 2,4-bis-morpholino-5-carboheptoxy pyrimidine is obtained in the form of an oil which cannot be distilled.

EXAMPLE 21

2,4-bis-morpholino-5-carboctoxy pyrimidine

Proceeding in a manner analogous to that described in Example 1, but using 2,4-dichloro-5-carboctoxy pyrimidine as starting material, 2,4-bis-morpholino-5-carboctoxy pyrimidine is obtained in the form of an oil which cannot be distilled.

EXAMPLE 22

2,4-bis-morpholino-5-carbocyclohexoxy pyrimidine

Proceeding in a manner analogous to that described in Example 1, but using 2,4-dichloro-5-carbocyclohexoxy pyrimidine as starting material, 2,4-bis-morpholino-5-carbocyclohexoxy pyrimidine, having an M.P. of 91–96°, is obtained.

EXAMPLE 23

2,4-bis-morpholino-5-carballyloxy pyrimidine

Proceeding in a manner analogous to that described in Example 1, but using 2,4-dichloro-5-carballyloxy pyrimidine as starting material, 2,4-bis-morpholino-5-carballyloxy pyrimidine, having an M.P. of 81.5–83.5°, is obtained.

EXAMPLE 24

2,4-bis-morpholino-5-carbocyclopentoxy pyrimidine

Proceeding in a manner analogous to that described in Example 1, but using 2,4-dichloro-5-carbocyclopentoxy pyrimidine as starting material, 2,4-bis-morpholino-5-carbocyclopentoxy pyrimidine is obtained in the form of an oil which cannot be distilled. The methanesulphonate of this base has an M.P. at 167–168°.

EXAMPLE 25

2,4-bis-morpholino-5-carbocycloheptoxy pyrimidine

Proceeding in a manner analogous to that described in Example 1, but using 2,4-dichloro-5-carbocycloheptoxy pyrimidine as starting material, 2,4-bis-morpholino-5-carbocycloheptoxy pyrimidine, having an M.P. 90–94°, is obtained.

EXAMPLE 26

2,4-bis-morpholino-5-carbo-(pentyl(3)oxy) pyrimidine

Proceeding in a manner analogous to that described in Example 8, but using 2,4-dichloro-5-carbo-(pentyl(3)oxy) pyrimidine as starting material, 2,4-bis-morpholino-5-carbo-(pentyl(3)oxy)pyrimidine is obtained, and after reacting this with picric acid 2,4-bis-morpholino-5-carbo-(pentyl(3)oxy) pyrimidine picrate, having an M.P. of 167–169°, is obtained.

EXAMPLE 27

2,4-bis-morpholino-5-cyclohexyl-methylenoxy-carbonyl-pyrimidine

Proceeding in a manner analogous to that described in Example 1, but using 2,4-dichloro-5-cyclohexyl-methylenoxy-carbonyl-pyrimidine as starting material, 2,4-bismorpholino-5 - cyclohexylmethylenoxy-carbonyl pyrimidine, having an M.P. of 95–99°, is obtained.

EXAMPLE 28

2,4-bis-morpholino-5-carbisobutylenoxy pyrimidine

Proceeding in a manner analogous to that described in Example 1, but using 2,4-dichloro-5-carbisobutylenoxy pyrimidine as starting material, 2,4-bis-morpholino-5-carbisobutylenoxy pyrimidine, having an M.P. of 68–70°, is obtained. This product is identical with the product obtained in accordance with Example 6.

EXAMPLE 29

2,4-bis-morpholino-5-carbobuten(2)oxy pyrimidine

Proceeding in a manner analogous to that described in Example 1, but using 2,4-dichloro-5-carbobuten(2)oxy pyrimidine as starting material, 2,4-bis-morpholino-5-carbobuten(2)oxy pyrimidine is obtained in the form of an oil which cannot be distilled.

EXAMPLE 30

2,4-bis-morpholino-5-carbo-(2-methyl-butoxy) pyrimidine

Proceeding in a manner analogous to that described in Example 1, but using 2,4 - dichloro-5-carbo-(2-methyl-butoxy) pyrimidine as starting material, 2,4-bis-morpholino-5-carbo-(2 - methyl-butoxy)-pyrimidine, having an M.P. of 90–94°, is obtained.

EXAMPLE 31

2,4-bis-morpholino-5-carbo-(2-ethyl-butoxy) pyrimidine

Proceeding in a manner analogous to that described in Example 1, but using 2,4-dichloro - 5 - carbo-(2-ethyl-butoxy) pyrimidine as starting material, 2,4-bis-morpholino-5-carbo-(2-ethyl-butoxy)-pyrimidine, having an M.P. of 113–116°, is obtained.

EXAMPLE 32

2,4-bis-morpholino-5-carbo-(2,2-dimethyl-propoxy)-pyrimidine

Proceeding in a manner analogous to that described in Example 8, but using 2,4-dichloro-5-carbo-(2,2-dimethyl-propoxy)-pyrimidine as starting material, 2,4-bis-morpholino - 5 - carbo-(2,2-dimethyl-propoxy) pyrimidine is obtained, and after reacting this with picric acid, 2,4-bis-morpholino-5-carbo-(2,2 - dimethylpropoxy) pyrimidine picrate, having an M.P. of 162–164°, is obtained.

EXAMPLE 33

2,4-bis-morpholino-5-carbo-(2-bromo-2-methyl-propoxy)-pyrimidine

Proceeding in a manner analogous to that described in Example 1, but using 2,4-dichloro-5-carbo-(2-bromo-2-methyl-propoxy)-pyrimidine as starting material, 2,4-bis-morpholino-5-carbo-(2-bromo-2-methyl-propoxy) pyrimidine, having an M.P. of 86–94°, is obtained. This product is identical with the product obtained in accordance with Example 4.

EXAMPLE 34

2,4-bis-morpholino-5-carbo-(2,3-dibromo-2-methyl-propoxy)-pyrimidine

Proceeding in a manner analogous to that described in Example 1, but using 2,4-dichloro-5-carbo-(2,3-dibromo-2-methylpropoxy) pyrimidine as starting material, 2,4-bis-morpholino-5-carbo-(2,3-dibromo - 2 - methyl-propoxy) pyrimidine, having an M.P. of 102–110°, is obtained. This product is identical with the product obtained in accordance with Example 5.

EXAMPLE 35

2,4-bis-morpholino-5-carbo-(1,3-dichloro-isopropoxy)-pyrimidine

Proceeding in a manner analogous to that described in Example 1, but using 2,4-dichloro-5-carbo-(1,3-dichloro-isopropoxy)-pyrimidine as starting material, 2,4-bis-morpholino-5-carbo-(1,3 - dichloro-isopropoxy) pyrimidine is obtained in the form of an oil which cannot be distilled.

EXAMPLE 36

2,4-bis-thiomorpholino-5-carbisobutoxy pyrimidine 9.8 g. of 2,4-dichloro-5-carbisobutoxy pyrimidine are dissolved in 90 cc. of absolute ethanol and 10 g. of triethyl amine and 8.6 g. of thiomorpholine are added. The mixture is heated under reflux for 5 hours and is subsequently evaporated to dryness. The residue is dissolved in chloroform and washed 5 times with water. The chloroform solution is dried with sodium sulphate and concentrated by evaporation. The residue is dissolved in ether and ethereal picric acid is added. The picrate obtained after concentrating the reaction mixture by evaporation is filtered with chloroform through aluminum oxide. The chloroform solution is concentrated by evaporation, whereby 2,4 - bis-thiomorpholino-5-carbisobutoxy pyrimidine is obtained in the form of an oil, which after standing yields crystals having an M.P. of 96–98°.

EXAMPLE 37

2,4-bis-thiomorpholino-5-carbocyclohexoxy pyrimidine

Proceeding in a manner analogous to that described in Example 36, but using 2,4-dichloro-5-carbocyclohexoxy pyrimidine as starting material, 2,4-bis-thiomorpholino-5-carbocyclohexoxy-pyrimidine, having an M.P. of 116–122°, is obtained.

EXAMPLE 38

2,4-bis-thiomorpholino-5-carbisopentoxy pyrimidine

Proceeding in a manner analogous to that described in Example 36, but using 2,4-dichloro-5-carbisopentoxy pyrimidine as starting material, 2,4-bis-thiomorpholino-5-carbisopentoxy pyrimidine, having a M.P. of 77–82°, is obtained.

EXAMPLE 39

2,4-bis-thiomorpholino-5-carbobutoxy pyrimidine

Proceeding in a manner analogous to that described in Example 36, but using 2,4-dichloro-5-carbobutoxy pyrimidine as starting material, 2,4-bis-thiomorpholino-5-carbobutoxy pyrimidine, having an M.P. of 63–69°, is obtained.

EXAMPLE 40

2,4-bis-morpholino-5-(2-ethoxy-ethoxy-carbonyl)-pyrimidine 13 g. of 2,4-dichloro-5-(2-ethoxy-ethoxy-carbonyl) pyrimidine are dissolved in 100 cc. of chloroform, and 18 g. of morpholine are added. The reaction mixture is heated to 70° for six hours, is subsequently washed with water, dried with sodium sulphate and concentrated by evaporation in a vacuum. The resulting viscous liquid is filtered through aluminum oxide, whereby 2,4-bis-morpholino-5-(2-ethoxy-ethoxy-carbonyl) pyrimidine is obtained in the form of an oil which cannot be distilled.

The 2,4-dichloro-5-(2-ethoxy-ethoxy-carbonyl) pyrimidine, used as starting material in this example, may be produced as follows:

A solution of 10 g. of 2,4-dichloro-uracil-5-carboxylic acid chloride in 30 cc. of absolute benzene is added dropwise while stirring and cooling with ice to a mixture of 4.3 g. of 2-ethoxyethanol, 7 g. of triethyl amine and 100 cc. of absolute benzene, whereupon the mixture is heated to 85° for 25 minutes. The reaction mixture is subsequently allowed to stand at room temperature for 15 hours, is washed with water, dried with sodium sulphate and concentrated by evaporation in a vacuum. 2,4-dichloro - 5 - (2-ethoxy-ethoxy-carbonyl) pyrimidine is obtained as residue in the form of a yellowish liquid.

EXAMPLE 41

2,4-bis-morpholino-5-carbo-(2-methoxy-ethoxy) pyrimidine

Proceeding in a manner analogous to that described in Example 40, but using 2,4-dichloro-5-carbo-(2-methoxy-ethoxy)-pyrimidine as starting material, 2,4-bis-morpholino-5-carbo-(2-methoxy-ethoxy) pyrimidine is obtained in the form of an oil which cannot be distilled.

EXAMPLE 42

2,4-bis-morpholino-5-carbo-(2-isopropyloxy-ethoxy)-pyrimidine

Proceeding in a manner analogous to that described in Example 40, but using 2,4-dichloro-5-carbo-(2-isopropyloxy-ethoxy)-pyrimidine as starting material, 2,4-bis-morpholino-5-carbo-(2-isopropyloxy-ethoxy) pyrimidine is obtained in the form of an oil which cannot be distilled.

EXAMPLE 43

2,4-bis-morpholino-5-carbo-(3-methoxy-butoxy) pyrimidine

Proceeding in a manner analogous to that described in Example 40, but using 2,4-dichloro-5-carbo-(3-methoxy-butoxy)-pyrimidine as starting material, 2,4-bis-morpholino-5-carbo-(3-methoxy-butoxy)pyrimidine is obtained in the form of an oil which cannot be distilled.

EXAMPLE 44

2,4-bis-morpholino-5-carbo-(2n-butoxy-ethoxy) pyrimidine

Proceeding in a manner analogous to that described in Example 40, but using 2,4-dichloro-5-carbo-(2n-butoxy-ethoxy)-pyrimidine as starting material, 2,4-bis-morpholino-5-carbo-(2n-butoxy-ethoxy) pyrimidine is obtained in the form of an oil which cannot be distilled.

EXAMPLE 45

2,4-bis-morpholino-5-carbo-(1,3-dimethyl-3-methoxy-butoxy) pyrimidine

Proceeding in a manner analogous to that described in Example 40, but using 2,4-dichloro-5-carbo-(1,3-dimethyl-3-methoxy-butoxy) pyrimidine as starting material, 2,4-bis-morpholino-5-carbo-(1,3-dimethyl-3-methoxy-butoxy) pyrimidine is obtained in the form of an oil which cannot be distilled.

EXAMPLE 46

2,4-bis-morpholino-5-carbo-(2-hexoxy-ethoxy) pyrimidine

Proceeding in a manner analogous to that described in Example 40, but using 2,4-dichloro-5-carbo-(2-hexoxy-ethoxy)-pyrimidine as starting material, 2,4-bis-morpholino-5-carbo-(2-hexoxy-ethoxy) pyrimidine is obtained in the form of an oil which cannot be distilled.

EXAMPLE 47

2,4-bis-morpholino-5-carbo-(1-methyl-2-methoxy-ethoxy)-pyrimidine

Proceeding in a manner analogous to that described in Example 40, but using 2,4-dichloro-5-carbo-(1-methyl-2-methoxy-ethoxy) pyrimidine as starting material, 2,4-bis-morpholino-5-carbo-(1-methyl-2-methoxy-ethoxy) pyrimidine is obtained in the form of an oil which cannot be distilled.

EXAMPLE 48

Description of a tablet composition

The production of tablets may be effected by mixing the products of the present invention, e.g., with lactose, and granulating with water, paraffin oil, 0.5% sodium alginate solution or 5% gelatin solution. The dry granulate is pressed into tablets in the presence of the usual tabletting aids, e.g. talc, maize starch, colloidal silicic acid or magnesium stearate.

In this manner it is possible to obtain, for example, tablets having the following composition:

| | Mg. |
|---|---|
| 2,4-bis-morpholino-5-carbisobutoxy pyrimidine | 250 |
| Lactose | 100 |
| Gelatin | 2 |
| Maize starch | 30 |
| Talc | 15 |
| Magnesium stearate | 3 |

The tablets are provided with a breaking slit.

What is claimed is:

1. A compound of the Formula I:

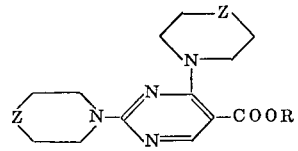

wherein Z is oxygen or sulphur, and R is alkyl, halo-substituted alkyl having up to 4 halo substituents, alkenyl, alkoxyalkyl, cycloalkyl or cycloalkylalkyl, each significance for R having up to 9 carbon atoms, and a pharmaceutically acceptable acid addition salt thereof.

2. The compound of claim 1, which is 2,4-bis-morpholino-5-carbisobutoxy pyrimidine.

3. The compound of claim 1, which is 2,4-bis-morpholino-5-carbo-(2-bromo-2-methyl-propoxy)pyrimidine.

4. The compound of claim 1, which is 2,4-bis-morpholino-5-carbo-(2,3-dibromo-2-methyl-propoxy)pyrimidine 5. The compound of claim 1, which is 2,4-bis-morpholino-5-carbisobutylenoxy pyrimidine.

6. The compound of claim 1, which is 2,4-bis-morpholino-5-carbisopropoxy pyrimidine.

7. The compound of claim 1, which is 2,4-bis-morpholino-5-carbobutoxy pyrimidine.

8. The compound of claim 1, which is 2,4-bis-morpholino-5-carbo-sec.butoxy pyrimidine.

9. The compound of claim 1, which is 2,4-bis-morpholino-5-carbo-tert.pentoxy pyrimidine.

10. The compound of claim 1, which is 2,4-bis-morpholino-5-carbohexoxy pyrimidine.

11. The compound of claim 1, which is 2,4-bis-morpholino-5-carbisopentoxy pyrimidine.

12. The compound of claim 1, which is 2,4-bis-morpholino-5-carbethoxy pyrimidine.

13. The compound of claim 1, which is 2,4-bis-morpholino-5-carbomethoxy pyrimidine.

14. The compound of claim 1, which is 2,4-bis-morpholino-5-carbopropoxy pyrimidine.

15. The compound of claim 1, which is 2,4-bis-morpholino-5-carbopentoxy pyrimidine.

16. The compound of claim 1, which is 2,4-bis-morpholino-5-carbo-tert.butoxy pyrimidine.

17. The compound of claim 1, which is 2,4-bis-morpholino-5-carbononoxy pyrimidine.

18. The compound of claim 1, which is 2,4-bis-morpholino-5-carboheptoxy pyrimidine.

19. The compound of claim 1, which is 2,4-bis-morpholino-5-carboctoxy pyrimidine.

20. The compound of claim 1, which is 2,4-bis-morpholino-5-carbocyclohexoxy pyrimidine.

21. The compound of claim 1, which is 2,4-bis-morpholino-5-carballyloxy pyrimidine.

22. The compound of claim 1, which is 2,4-bis-morpholino-5-carbocyclopentoxy pyrimidine.

23. The compound of claim 1, which is 2,4-bis-morpholino-5-carbocycloheptoxy pyrimidine.

24. The compound of claim 1, which is 2,4-bis-morpholino-5-carbo-(pentyl(3)oxy) pyrimidine.

25. The compound of claim 1, which is 2,4-bis-morpholino-5-cyclohexyl-methylenoxy-carbonyl pyrimidine.

26. The compound of claim 1, which is 2,4-bis-morpholino-5-carbobuten(2)oxy pyrimidine.

27. The compound of claim 1, which is 2,4-bis-morpholino-5-carbo-(2-methyl-butoxy) pyrimidine.

28. The compound of claim 1, which is 2,4-bis-morpholino-5-carbo-(2-ethyl-butoxy) pyrimidine.

29. The compound of claim 1, which is 2,4-bis-morpholino-5-carbo-(2,2-dimethyl-propoxy) pyrimidine.

30. The compound of claim 1, which is 2,4-bis-morpholino-5-carbo-(2-bromo-2-methyl-propoxy) pyrimidine.

31. The compound of claim 1, which is 2,4-bis-morpholino - 5 - carbo-(2,3-dibromo - 2 - methyl-propoxy) pyrimidine.

32. The compound of claim 1, which is 2,4-bis-morpholino-5-carbo-(1,3-dichloro-isopropoxy) pyrimidine.

33. The compound of claim 1, which is 2,4-bis-thiomorpholino-5-carbisobutoxy pyrimidine.

34. The compound of claim 1, which is 2,4-bis-thiomorpholino-5-carbocyclohexoxy pyrimidine.

35. The compound of claim 1, which is 2,4-bis-thiomorpholino-5-carbisopentoxy pyrimidine.

36. The compound of claim 1, which is 2,4-bis-thiomorpholino-5-carbobutoxy pyrimidine.

37. The compound of claim 1, which is 2,4-bis-morpholino-5-(2-ethoxy-ethoxy-carbonyl) pyrimidine.

38. The compound of claim 1, which is 2,4-bis-morpholino-5-carbo-(2-methoxy-ethoxy) pyrimidine.

39. The compound of claim 1, which is 2,4-bis-morpholino-5-carbo-(2-isopropyloxy-ethoxy) pyrimidine.

40. The compound of claim 1, which is 2,4-bis-morpholino-5-carbo-(3-methoxy-butoxy) pyrimidine.

41. The compound of claim 1, which is 2,4-bis-morpholino-5-carbo-(2n-butoxy-ethoxy) pyrimidine.

42. The compound of claim 1, which is 2,4-bis-morpholino - 5 - carbo-(1,3-dimethyl - 3 - methoxy-butoxy) pyrimidine.

43. The compound of claim 1, which is 2,4-bis-morpholino-5-carbo-(2-hexoxy-ethoxy) pyrimidine.

44. The compound of claim 1, which is 2,4-bis-morpholino-5-carbo-(1-methyl-2-methoxy-ethoxy) pyrimidine.

45. A compound of the formula:

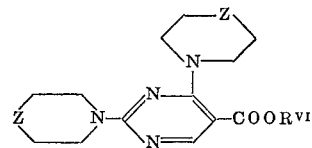

wherein Z is oxygen or sulphur, and $R^{VI}$ is alkyl having up to 9 carbon atoms and having one or more hydroxy substituents.

46. The compound of claim 46, which is 2,4-bis-morpholino-5-carboxylic acid (2 - hydroxy-2,2-dimethylethyl ester) pyrimidine.

References Cited

UNITED STATES PATENTS 2,024,525   12/1965   Kalischor et al. _____ 260—246

ALEX MAZEL, Primary Examiner

R. J. GALLAGHER, Assistant Examiner

U.S. Cl. X.R.

260—246, 251